United States Patent
Maresse

(10) Patent No.: US 7,391,580 B2
(45) Date of Patent: Jun. 24, 2008

(54) ULTRA COMPACT MONO-BLOC CATADIOPTRIC IMAGING LENS

(76) Inventor: Zeev Maresse, 52 Piakas St., Tel Aviv (IL) 62261

(*) Notice: Subject to any disclaimer, the term of this patent is extended or adjusted under 35 U.S.C. 154(b) by 32 days.

(21) Appl. No.: 11/544,857

(22) Filed: Oct. 10, 2006

(65) Prior Publication Data
US 2007/0115564 A1    May 24, 2007

Related U.S. Application Data

(60) Provisional application No. 60/735,870, filed on Nov. 14, 2005.

(51) Int. Cl.
*G02B 17/00* (2006.01)

(52) U.S. Cl. .......... 359/726; 359/678; 359/718; 359/727; 359/728; 359/730; 359/732; 359/737; 359/742; 359/796

(58) Field of Classification Search .......... 359/678, 359/718, 726–728, 730, 732, 737, 742, 796
See application file for complete search history.

(56) References Cited

U.S. PATENT DOCUMENTS

| 5,042,928 A | 8/1991 | Richards |
| 5,699,194 A * | 12/1997 | Takahashi .......... 359/633 |
| 5,793,538 A | 8/1998 | Cameron et al. |

OTHER PUBLICATIONS

M. M. Rusinov, "Composition (Design) of Optical Systems", Machinostrdenie, 1989, Leningrad, Russia p. 307, Fig. 1.

* cited by examiner

*Primary Examiner*—Evelyn A. Lester

(57) ABSTRACT

A mono-bloc catadioptric imaging lens comprising a solid body and a single-focal Maksutov type construction characterized by two refractive surfaces and two reflective surfaces wherein all surfaces are surfaces of revolution and wherein at least one surface is aspheric.

12 Claims, 5 Drawing Sheets

```
Surf        Type                                    Radius
Thickness   Glass                     Diameter      Conic 1   ASPH                          -42.04875     13.83651
GERMANIUM   25.6                      0

Coeff on r  2 :            0
        Coeff on r  4 :  -1.824079e-005
        Coeff on r  6 :  -2.2290352e-009
        Coeff on r  8 :  -2.3711108e-010

2   ASPH                          -27.96296     -12.79367    MIRROR
        34.6                  -2.150089

Coeff on r  2 :            0
        Coeff on r  4 :  -1.2745658e-005
        Coeff on r  6 :   2.6250228e-010
        Coeff on r  8 :  -1.5918525e-011

3   ASPH                          -9.810966     12.46233     MIRROR
        10.66                 -1.819187

Coeff on r  2 :            0
        Coeff on r  4 :  -2.7512548e-005
        Coeff on r  6 :  -5.1631188e-007
        Coeff on r  8 :   4.1978617e-010
        Coeff on r 10 :   3.5387648e-010
        Coeff on r 12 :  -7.7326572e-013

4   ASPH                          -43.14772     7.988193
        10.5                       0

Coeff on r  2 :            0
        Coeff on r  4 :   0.00021226951
        Coeff on r  6 :  -8.7559056e-006
        Coeff on r  8 :   5.6851383e-007
        Coeff on r 10 :  -1.6662253e-008
        Coeff on r 12 :   2.1175496e-010
```

FIG. 5

ULTRA COMPACT MONO-BLOC CATADIOPTRIC IMAGING LENS

CROSS REFERENCE TO RELATED APPLICATIONS

The present invention claims priority from U.S. Provisional Patent Application No. 60/735,870 filed Nov. 14, 2005, the content of which is incorporated herein by reference.

FIELD OF THE INVENTION

The present invention relates generally to single element imaging lenses and, and more specifically, to mono-bloc catadioptric solid imaging lenses with a fixed focal length.

BACKGROUND OF THE INVENTION

Mono-bloc catadioptric (or "catadioptic")lenses are known. One of the first was suggested by Dmitry Maksutov, who showed more than half a century ago that the two-separate-mirror system named after him can be made more rugged and stable by fabricating it in a glass mono-bloc. The design is shown in FIG. 1 and described on page 307 (FIG. 29a) of "Composition (Design) of Optical Systems" by M. M. Rusinov, Mashinostroenie, 1989, Leningrad, Russia. However, Maksutov encountered significant difficulties in actually fabricating his lens, which required centering four spherical surfaces and keeping a high tolerance of the central bloc thickness. Also, the saggitae of all surfaces had to be accounted for in the design and fabrication.

Mono-bloc catadioptric lenses were disclosed in a number of U.S. patents, including U.S. Pat. No. 5,793,538 to Cameron et al, and U.S. Pat. No. 5,042,928 to Richards. Cameron's solid catadioptric lens includes a substantially planar input surface, a primary concave mirror, a secondary convex mirror and a substantially spherical exit surface. The lens is composed of a solid material chosen according to the particular imaging application in which the lens is to be used. Radiation enters lens through the input surface, travels through the solid material and is reflected off the primary mirror. Radiation subsequently passes internally through the solid material and is reflected off the secondary mirror. Subsequent to being reflected off the secondary mirror, the radiation passes through the solid material and out of the lens through the spherical exit surface and onto a detector array for imaging purposes. In Cameron's lens, all surfaces are spherical (including the "planar" surface, which has a substantially infinite radius.

Richards discloses a single hybrid optical element that contains a reflective outer annulus zone and a refractive inner core zone to produce a single catadioptric lens element of high quality and high efficiency. The "hybrid" attribute indicates that the lens is composed actually of two distinct optical elements. Richards's system is basically a Bowen-type system, which has a first mirror smaller then a second one. It has six surfaces—four refractive and two reflective and produces two images, one from the central refractive lens the second from the mirror system. In a particular embodiment, the reflective outer annulus zone of the element utilizes Siedentopf's cardioid formulation and the refractive inner core zone utilizes the Cartesian formulation. A key requirement of this combination, for coherent applications, is the proper phasing of the two zones, which can readily be accomplished by tuning whichever zone is most convenient.

Non-imaging mono-bloc lenses with aspheric surfaces are known (e.g. in multi-focal lenses), but these surfaces are not surfaces of revolution. The use of aspheric surfaces yields well known advantages It would be therefore advantageous to provide a mono-bloc Maksutov type catadioptric imaging lens with multiple on-axis aspheric surfaces, which can be designed in various materials for operation in the visible spectral range and/or the near and far infrared spectral range (spectral range of 0.4-15 micrometer).

SUMMARY OF THE INVENTION

The present invention provides a mono-bloc catadioptric solid imaging lens similar to Maksutov's but including aspheric surfaces of revolution. The lens is a single focal lens, made of a single body of material and comprising, in a preferred embodiment, four optical surfaces, two reflective (mirrors) and two refractive. The asphericity of the surfaces may be achieved by methods such as diamond turning, molding, polishing and other shape generating methods well known in the art of lens-making. The lens may be implemented in materials such as polymers, Ge, Si, ZnS, ZnSe, waterless ZnS, AMTIR™, Gazir™, $CaF^2$, plastic materials or any other optically transparent materials. The transparency of the material for making the lens will determine the spectral range in which the lens will operate.

In contrast with Richard's construction, the mono-bloc lens of the present invention is a single element (not hybrid) lens with four surfaces. In further contrast with Richards, herein all surfaces are surfaces of revolution and aspheric. Exemplarily and in further contrast with prior art, such aspheric surfaces of revolution have been fabricated in Ge lenses by diamond turning. In some embodiments, lenses of the present invention further include diffractive elements on one or both refractive surfaces.

The present lens thus provides an improved multi-surface lens, which replaces the need for multiple optical elements that need to be assembled on-axis to create a complete lens. The mono-bloc lens of the present invention can be used as a stand-alone optical element which can act as an independent, full optical imaging lens. Alternatively, it can be used as part of an optical assembly, e.g. a telescope, as a full imaging lens array incorporated in any optical system assembly, or in an optical combination with another mono-bloc lens.

According to the present invention there is provided a mono-bloc catadioptric imaging lens including a body bound by two reflective surfaces of revolution and two refractive surfaces of revolution, wherein at least one of the surfaces is aspheric.

According to the present invention there is provided a mono-bloc catadioptric imaging lens comprising: a solid body 2 Maksutov type construction characterized by two refractive surfaces of revolution and two reflective surfaces of revolution, wherein at least one surface is aspheric. In a preferred embodiment of the lens, all four surfaces of revolution are aspheric.

BRIEF DESCRIPTION OF THE DRAWINGS

For a better understanding of the present invention and to show more clearly how it could be applied, reference will now be made, by way of example only, to the accompanying drawings in which:

FIG. 5 shows detailed lens data.

DETAILED DESCRIPTION OF THE PREFERRED EMBODIMENTS

Figure 1:
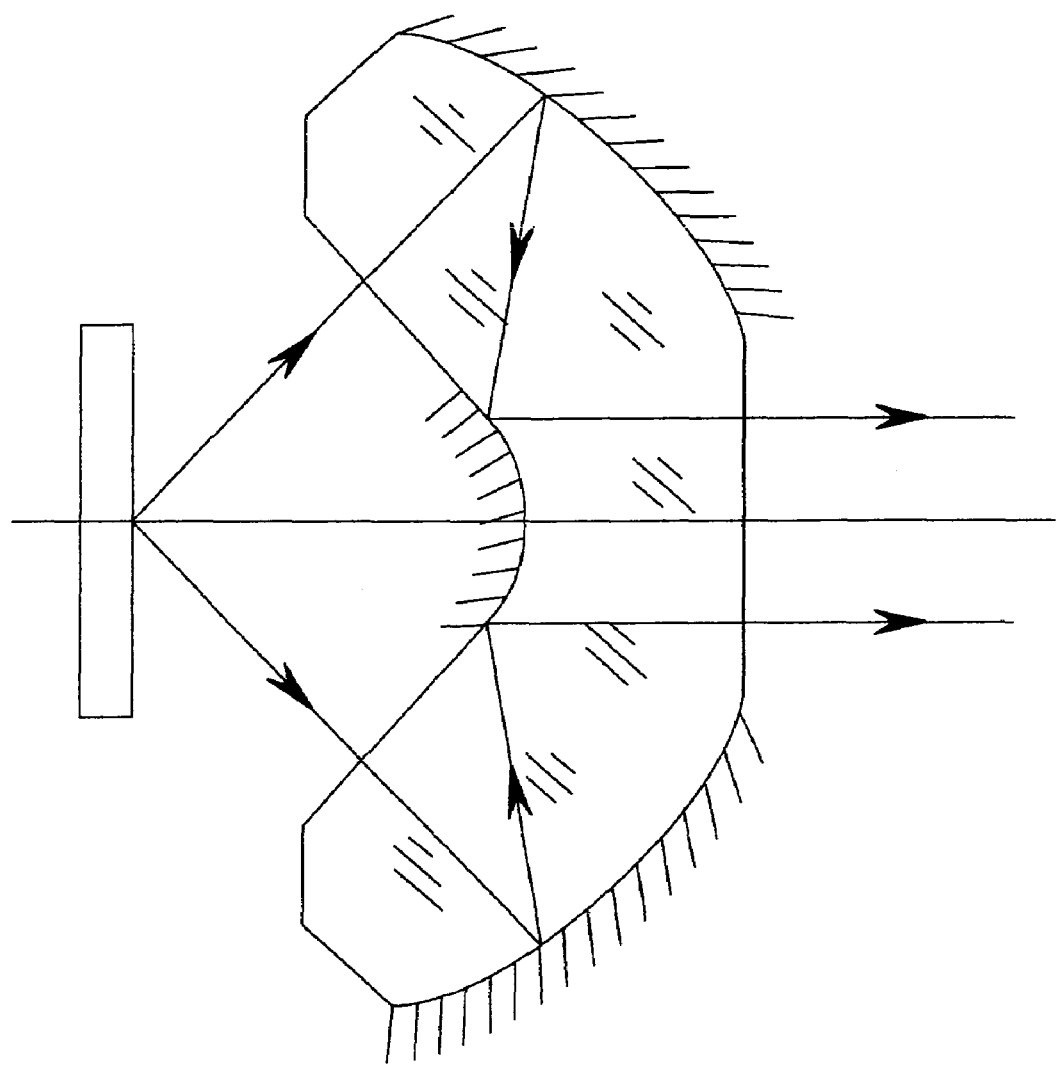
FIG. 1 shows a Maksutov mono-bloc imaging lens.
Figure 2:
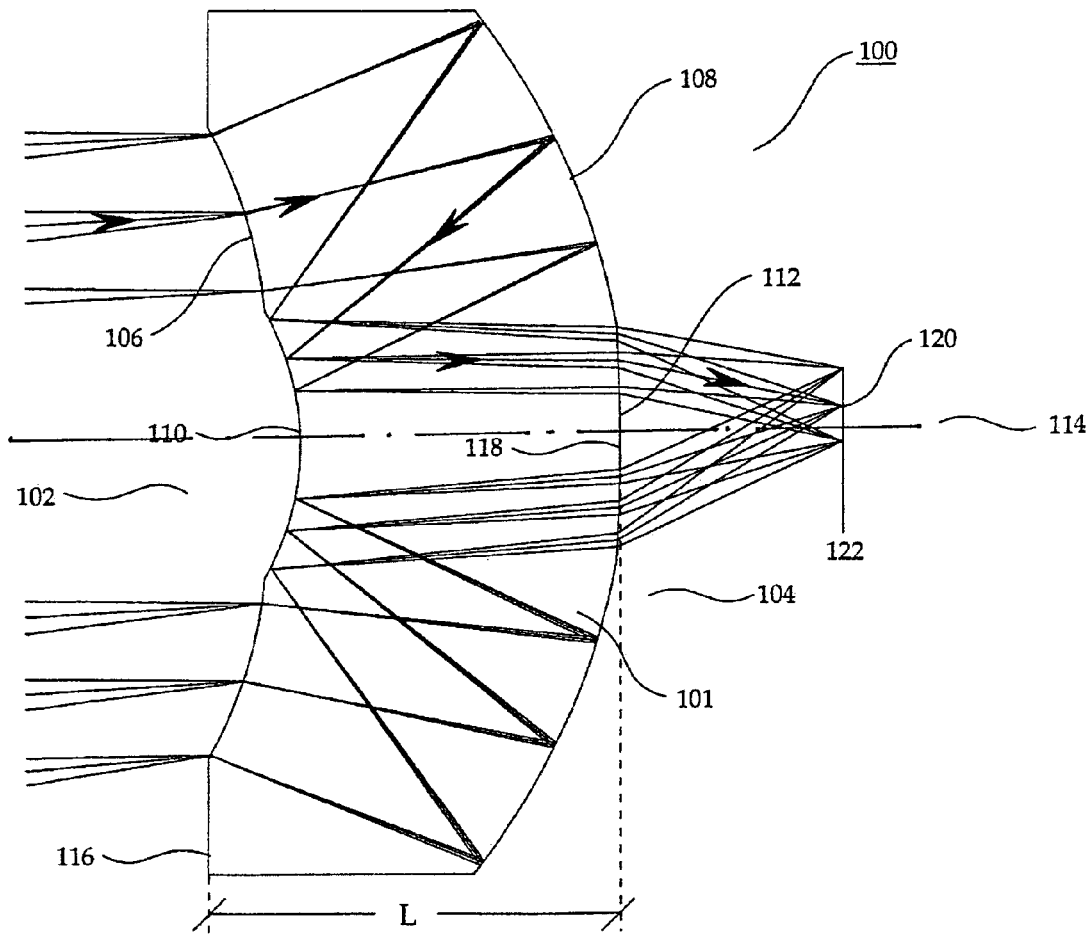
FIG. 2 shows schematically a preferred embodiment of the mono-bloc lens of the present invention, including optical layout and beam paths.

FIG. 2 shows schematically an embodiment of a mono-bloc imaging lens 100 of the present invention, including the optical layout and beam paths. Lens 100 comprises a body 101 bound by two opposite side surfaces 102 and 104. The side surfaces include four single-focal, on-axis surfaces of revolution 106, 108, 110 and 112. The surfaces of revolution are defined relative to an axis 114 as in a Maksutov mono-bloc lens (i.e. they all revolve around single axis 114). Each surface of revolution has a predetermined shape and function. Exemplarily, surfaces 106 and 112 are refractive (and preferably include an anti-reflection coating) while surfaces 108 and 110 are reflective. In some embodiments, the refractive surfaces include anti-reflection coatings. In some embodiments, the reflective surfaces include mirror coatings. In a preferred embodiment, all surfaces are aspheric. In other embodiments at least one surface of revolution is aspheric. Each side surface is characterized by an extreme point, exemplarily points 116 and 118. The distance between these points define a lens mechanical length L.

Figure 3:
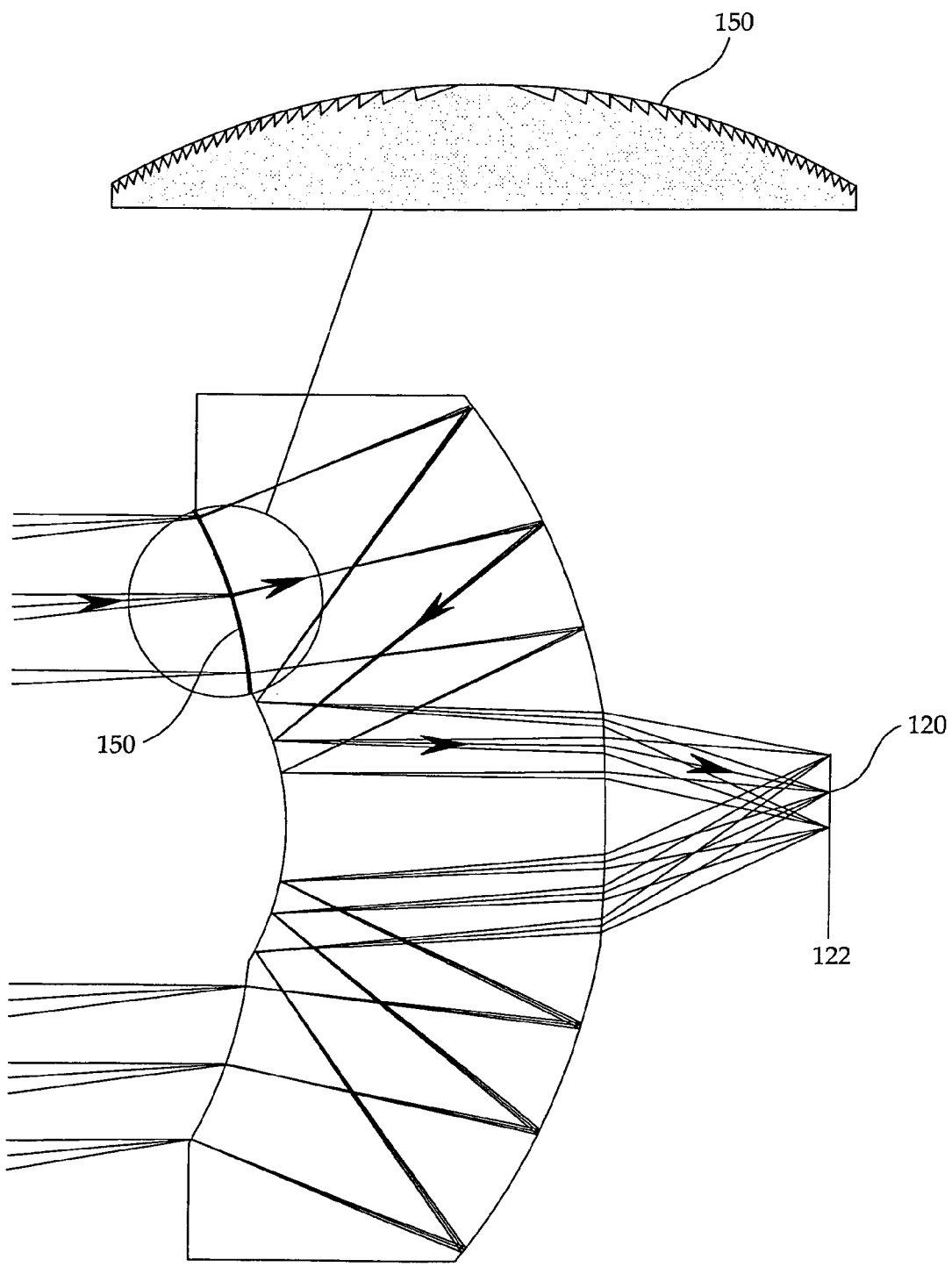
FIG. 3 shows a lens embodiment with a diffractive element on each refractive surface.

In some embodiments, at least one of the refractive surfaces is diffractive, in order to improve image quality. FIG. 3 shows a lens embodiment with a diffractive element 150 on each refractive surface. The diffractive element is also shown separately in a magnified view. Diffractive elements and surfaces are well known in the art, and described for example in U.S. Pat. No. 6,999,243 to Chipper.

Considered broadly, the lens of the present invention is a solid Maksutov-type mono-bloc lens with aspheric surfaces, and with or without diffractive surfaces. In contrast with multi-focal lenses, the lens disclosed herein is both catadioptric and single focal. The lens is advantageously formed in a single material that may be selected from the group consisting of (but is not limited to) a polymer, a plastic, Ge, Si, ZnS, ZnSe, waterless ZnS, AMTIR™, Gazir™ $CaF_2$ or any other material optically transparent in a wavelength range of interest. The surfaces may be coated with at least one thin film coating using any thin film coating technology. The coating may be reflective, anti-reflective or both. in part of or all of the spectral range of 0.4-14 micron. The lens and in particular the aspheric surface(s) can be fabricated using any known techniques including methods such as diamond turning, molding, grinding-polishing and other aspheric shape surface generating methods.

In operation (see FIG. 3), as in a regular (non-aspheric surface) mono-bloc Maksutov lens, rays arriving from side 102 enter the lens through refractive surface 106, are reflected from reflective surface 108 to reflective surface 110 and from there to refractive surface 112, through which they exit the lens and are focused at a point 120 on a focal plane 122. Note that point 120 represents an exact single focal point, in contrast with hybrid lenses like Richards', which in principle cannot have an exact single focal point.

Figure 4:
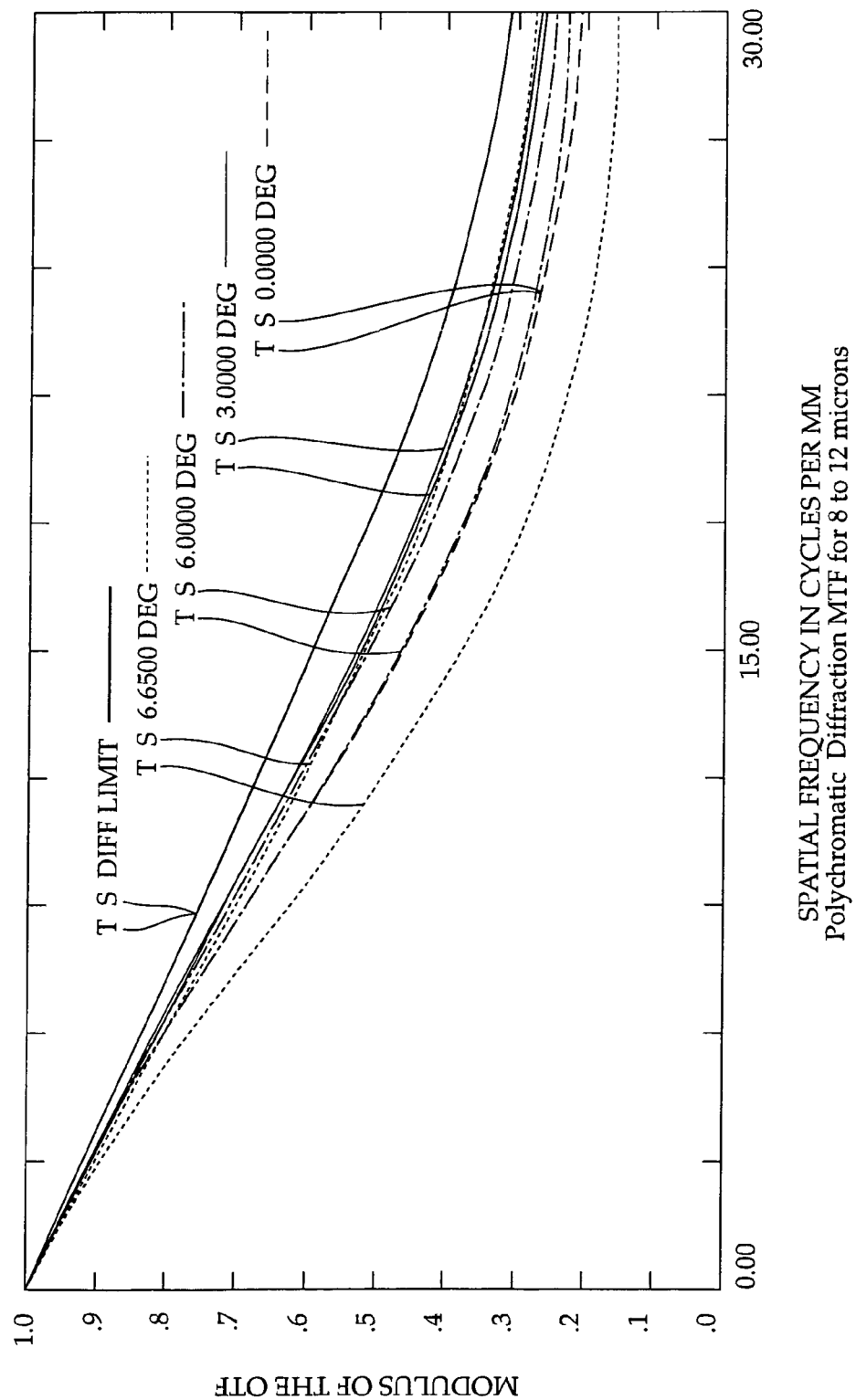
FIG. 4 shows a graph depicting the nominal MTF as a function of frequency.

FIGS. 4 and FIG. 5 show details of an exemplary lens fabricated in accord with the present invention. FIG. 4 shows a graph depicting the nominal MTF as a function of frequency. FIG. 5 provides detailed lens data showing the aspheric surface parameters for the same lens. More details of lenses fabricated according to the present invention are available in material published by Temmek Optics Ltd., P.O. Box 159, Yavne, ZC 81101, Israel.

In an imaging system, compactness is of utmost importance. A measure of compactness is the telephoto ratio (T.R.) defined as the ratio of the mechanical length L divided by the focal length FA. In a typical imaging lens, with FA=30 mm and L=40 mm, T.R.≈1.33. With a lens of the present invention, in which FA=30 mm and L=13.5 mm, T.R.≈0.45. The mechanical length of the imaging lens of this invention will always be shorter than the mechanical length of an imaging system with the same optical parameters (FA and F#) by at least 30-40%. This is therefore a major advantage of the imaging lens of the present invention. Other advantages include simplified mounting, light-weight mounting, thermal stability and simplified alignment. Obviously, another major advantage is the replacement of a plurality of optical elements normally needed to provide the same function (as done at present and as known in the art) by a single element.

All patents and publications mentioned in this specification are herein incorporated in their entirety by reference into the specification, to the same extent as if each individual patent was specifically and individually indicated to be incorporated herein by reference.

While the invention has been described with respect to a limited number of embodiments, it will be appreciated that many variations, modifications and other applications of the invention may be made.

What is claimed is:

1. A mono-bloc catadioptric imaging lens comprising a solid body bound by two reflective surfaces of revolution and two refractive surfaces of revolution arranged in a Maksutov arrangement, wherein one refractive surface and one reflective surface define a side of the lens and wherein all surfaces are aspheric, whereby the lens is single focal and compact.

2. The lens of claim 1, wherein at least one of the aspheric refractive surfaces includes a diffractive element.

3. The lens of claim 1, formed in an optically transparent material selected from the group consisting of polymers, Ge, Si, ZnS, ZnSe, waterless ZnS, AMTIR™, Gazir™, $CaF_2$ and plastic materials.

4. The lens of claim 1, wherein a distance between extreme points of the lens sides define a mechanical length.

5. A mono-bloc catadioptric imaging lens comprising:
   a) a solid body, and
   b) a single-focal, Maksutov construction characterized by two refractive surfaces and two reflective surfaces, wherein all surfaces are surfaces of revolution and wherein at least one surface is aspheric.

6. The lens of claim 5, wherein all four surfaces are aspheric.

7. The lens of claim 5, further comprising a diffractive element on at least one refractive surface.

8. The lens of claim 5, wherein each refractive surface includes an anti-reflection coating.

9. The lens of claim 5, wherein each reflective surface includes a mirror coating.

10. The lens of claim 5, wherein the solid body is formed in an optically transparent material selected from the group consisting of polymers, Ge, Si, ZnS, ZnSe, waterless ZnS, AMTIR™, Gazir™, $CaF_2$ and plastic materials.

11. The lens of claim 5, wherein the lens has a mechanical length smaller by at least 30% than a mechanical length of an imaging system with the same focal length and F number.

12. A mono-bloc catadioptric imaging lens comprising a body with two opposite side surfaces, wherein each side surface includes one reflective surface of revolution and one refractive surface of revolution, wherein all surfaces of revolution are aspheric and wherein the aspheric surfaces of revolution have a Maksutov spatial arrangement.

* * * * *

UNITED STATES PATENT AND TRADEMARK OFFICE
CERTIFICATE OF CORRECTION

PATENT NO. : 7,391,580 B2
APPLICATION NO. : 11/544857
DATED : June 24, 2008
INVENTOR(S) : Zeev Maresse It is certified that error appears in the above-identified patent and that said Letters Patent is hereby corrected as shown below:

On the title page, item: [76] "52 Piakas St." should be --52 Pinkas St.--

Signed and Sealed this

Twenty-first Day of October, 2008

JON W. DUDAS
*Director of the United States Patent and Trademark Office*